United States Patent [19]

Armond

[11] 4,348,213

[45] Sep. 7, 1982

[54] PROCESS FOR THE SEPARATION OF A GASEOUS MIXTURE

[75] Inventor: John W. Armond, Buckhurst Hill, England

[73] Assignee: BOC Limited, London, England

[21] Appl. No.: 248,600

[22] Filed: Mar. 27, 1981

[30] Foreign Application Priority Data

Mar. 31, 1980 [GB] United Kingdom ............... 8010799

[51] Int. Cl.³ .................................................. B01D 53/04
[52] U.S. Cl. ............................................. 55/25; 55/58; 55/62; 55/75
[58] Field of Search .................... 55/25, 26, 33, 58, 62, 55/68, 74, 75

[56] References Cited

U.S. PATENT DOCUMENTS

| | | | |
|---|---|---|---|
| 3,085,379 | 4/1963 | Kiyonaga et al. | 55/62 X |
| 3,338,030 | 8/1967 | Feldbauer, Jr. | 55/62 X |
| 3,659,399 | 5/1972 | Kauer, Jr. et al. | 55/33 |
| 3,680,288 | 8/1972 | Eluard | 55/58 |
| 3,880,616 | 4/1975 | Myers et al. | 55/62 |
| 3,891,411 | 6/1975 | Meyer | 55/62 X |
| 3,923,477 | 12/1975 | Armond et al. | 55/58 X |
| 4,065,272 | 12/1977 | Armond | 55/58 X |
| 4,129,424 | 12/1978 | Armond | 55/58 X |
| 4,144,037 | 3/1979 | Armond et al. | 55/58 |
| 4,144,038 | 3/1979 | Armond | 55/58 |
| 4,168,149 | 9/1979 | Armond et al. | 55/58 X |
| 4,222,750 | 9/1980 | Gauthier et al. | 55/62 X |
| 4,256,469 | 3/1981 | Leitgeb | 55/62 X |

FOREIGN PATENT DOCUMENTS

| | | |
|---|---|---|
| 2702784 | 7/1978 | Fed. Rep. of Germany . |
| 1364674 | 8/1974 | United Kingdom . |
| 1424501 | 2/1976 | United Kingdom . |
| 1437344 | 5/1976 | United Kingdom ............ 55/25 |
| 1437600 | 5/1976 | United Kingdom ............ 55/58 |
| 1480866 | 7/1977 | United Kingdom . |
| 1541767 | 3/1979 | United Kingdom . |

Primary Examiner—Robert H. Spitzer
Attorney, Agent, or Firm—David L. Rae; Larry R. Cassett

[57] ABSTRACT

In a gas separation process a pressurized gaseous mixture is passed through a first bed of adsorbent while a second bed is being regenerated by desorbing gas therefrom and venting or discharging such gas from the second bed. The adsorbent is of such a character that one component of the gaseous mixture is preferentially adsorbed. The non-adsorbed component or components are collected as product. After a chosen time flow of gas into the first bed and out of the second bed is stopped, and the two beds are placed in communication with one another through a flow restrictor means so as to reduce the pressure difference therebetween. The flow restriction means is effective to prevent fluidization of the beds. The intercommunication between the two beds is stopped before the pressure difference therebetween has been eliminated and the gas mixture is then passed through the second bed, while the first is regenerated. The pressure difference between the two beds is then reduced and the cycle of operations repeated.

6 Claims, 3 Drawing Figures

PROCESS FOR THE SEPARATION OF A GASEOUS MIXTURE

BACKGROUND OF THE INVENTION

This invention relates to a process for the separation of a gaseous mixture, particularly air.

U.K. patent specification Nos. 1,480,866 and 1,541,767, and German Offenlegungsschrift No. 2 702 784 all relate to processes for the separation of nitrogen from air employing an adsorbent which has the ability to effect a separation as between the two major components of air by virtue of its more rapid adsorption of oxygen than of nitrogen. The adsorbent is typically molecular sieve carbon, for example, as described in U.K. patent specification Nos. 1,364,674 and 1,424,501. In operation, a bed of the adsorbent is put through a cycle which includes an adsorption step during which time air is pumped through the bed, most of the oxygen and a proportion of the nitrogen and substantially all of the carbon dioxide and water vapour in the feed are adsorbed, and a nitrogen-rich product gas is supplied from the outlet of the bed; and a desorption step during which time the outlet of the bed is closed, the bed is vented to atmospheric pressure through its inlet and/or evacuated through its inlet so that the adsorbed gases are substantially removed from the bed thereby preparing it for the next adsorption step.

In practice, two adsorbent beds are employed and operated on similar cycles which are sequenced to be out of phase with one another by 180° so that when one bed is on its adsorption step, the other bed is on it desorption step, and vice versa. Moreover, it is usual to equalise the pressures in the two beds between each step by connecting the two bed inlets together and connecting the two bed outlets together. With these connections made the gas within the void spaces of the bed which has just completed its adsorption step is drawn into the bed which has just completed its desorption step by virtue of the pressure difference which exists between the beds at that stage, and this is found to be beneficial in maximising the product output because the gas in such void spaces will have already become somewhat enriched in nitrogen.

In order to connect together the two bed inlets and the two bed outlets as aforementioned stop-valves are opened in passages connecting together the inlets and the outlets respectively. Since, in practice, the initial pressure difference between the two beds when the valves are first opened is relatively large (typically in the order of several bars) there is a tendency for the upward passage of gas through the outlet of the bed at higher pressure to lift or fluidise some of the adsorbent in the bed and thereby cause it to strike other particles and walls of the vessel containing that bed. We have found that repeated lifting of the bed in such a manner reduces the efficiency of the adsorbent.

In the process described in U.K. Patent specification No. 1,480,866 product is taken from the outlet of the bed that is for the time being adsorbing. There is no means described for setting the product flow rate or controlling the pressure of the product. Thus, the product nitrogen-rich gas is obtained at a varying flow rate and pressure. In U.K. specification No. 1,541,767 the gas leaving the bed that for the time being is adsorbing is passed through a throttle valve so as to give an increasing product flow rate as the bed pressure rises. In German specification No. 2 702 784 no means for setting the product flow rate is described.

OBJECT OF THE INVENTION

It is an object of the present invention to provide a process for separating a gas mixture which may be operated so as to prevent lifting of a bed of adsorbent from taking place.

SUMMARY OF THE INVENTION

According to the present invention there is provided a process for the separation of a gas mixture which includes:

(1) repeatedly performing a cycle of operations on a first bed of adsorbent which adsorbs one component of the gas mixture more readily than another or the other component of the gas mixture, the cycle of operation comprising the steps of:
  (a) passing the gaseous mixture at superatmospheric pressure through the bed of adsorbent and thereby adsorbing said one component;
  (b) reducing the pressure of the bed to a value intermediate said superatmospheric pressure and atmospheric pressure;
  (c) regenerating the bed, which step comprises desorbing gas therefrom by further reducing the pressure of the bed and causing the desorbed gas to flow out of the bed in a direction counter to the direction of passing the gaseous mixture, and
  (d) increasing the pressure of the bed to a value intermediate said superatmospheric pressure and atmospheric pressure;

(2) repeatedly performing such a cycle of operations on a second bed of such adsorbent; wherein the cycles are phased such that when the pressure of one bed is reduced after adsorption but before its regeneration, the pressure of the other bed is being increased after its regeneration but before adsorption, and vice versa, and steps (b) and (d) are performed by placing the beds in communication with one another through at least one restricted passage for a period of time insufficient for the pressures of the beds to equalise.

Typically, at the end of step (a), flow of gas mixture into the bed is stopped and at the end of step (c), flow of desorbed gas out of the bed is stopped.

Typically the gas mixture to be separated is air and the adsorbent is a carbon molecular sieve. Thus, oxygen is adsorbed from the gas mixture leaving a product gas relatively rich in nitrogen.

Preferably, the step of placing the beds in communication with one another through at least one restricted passage is performed so as to reduce the pressure difference between the beds to a chosen value typically in the range 0.07 to 0.7 bar. Typically, the stop valve or valves in the restricted passage or passages remain open for a period of from four to five seconds at a time. In other words, steps (b) and (d) are preferably each performed for a period of four to five seconds at a time.

The process according to the present invention makes it possible by restricting the flow of gas from one bed to the other to prevent the upward force on the adsorbent at the top of the bed ever to exceed the gravitational force of one such adsorbent, thus preventing the occurrence of bed lifting. Preferably, the passage of gas between the beds is so restricted that the upward force on the adsorbent owing to gas flow does not exceed one half of the gravitational force thereupon. Preferably, there are two restricted conduits which, when open, provide a gas passage from one bed to the other. One conduit, when open, affords a gas passage between the top of one bed and the top of the other, and the other conduit, when open, affords a gas passage from the bottom of one bed to the bottom of the other. Desirably, the two conduits are so restricted that the flow rate through the top conduit is equal to the flow rate through the bottom conduit. If the total quantity of gas flowing through the bottom conduit exceeds that flowing through the top conduit the output of product from the plant is affected adversely. On the other hand, if the quantity of gas flowing through the top conduit exceeds that through the bottom conduit, then it may not be possible to prevent bed lifting without extending for an undesirable period of time each individual period when the two beds are in communication with one another.

Preferably during step (a) of the cycle of operations the unadsorbed gas is passed into a buffer vessel from which the product gas is continuously taken, the flow of product gas out of the buffer vessel being controlled by a flow control valve or other flow control means, flow of gas into the buffer vessel being allowed only when the pressure in the adsorbent bed for the time being in communication therewith exceeds that in the buffer vessel. Such control of the gas flow to the buffer vessel may be effected by means of a conventional non-return or one-way valve. This makes it possible continuously to obtain product gas at a constant flow rate and at a pressure which undergoes only relatively small fluctuations in comparison with the changes of pressure that take place in the adsorbent beds.

References to the pressure of an adsorbent bed herein are references to the pressure of the unadsorbed gas in such bed.

The process according to the invention will now be described by way of example with reference to the accompanying drawings, in which:

DESCRIPTION OF PREFERRED EMBODIMENT

Figure 1:
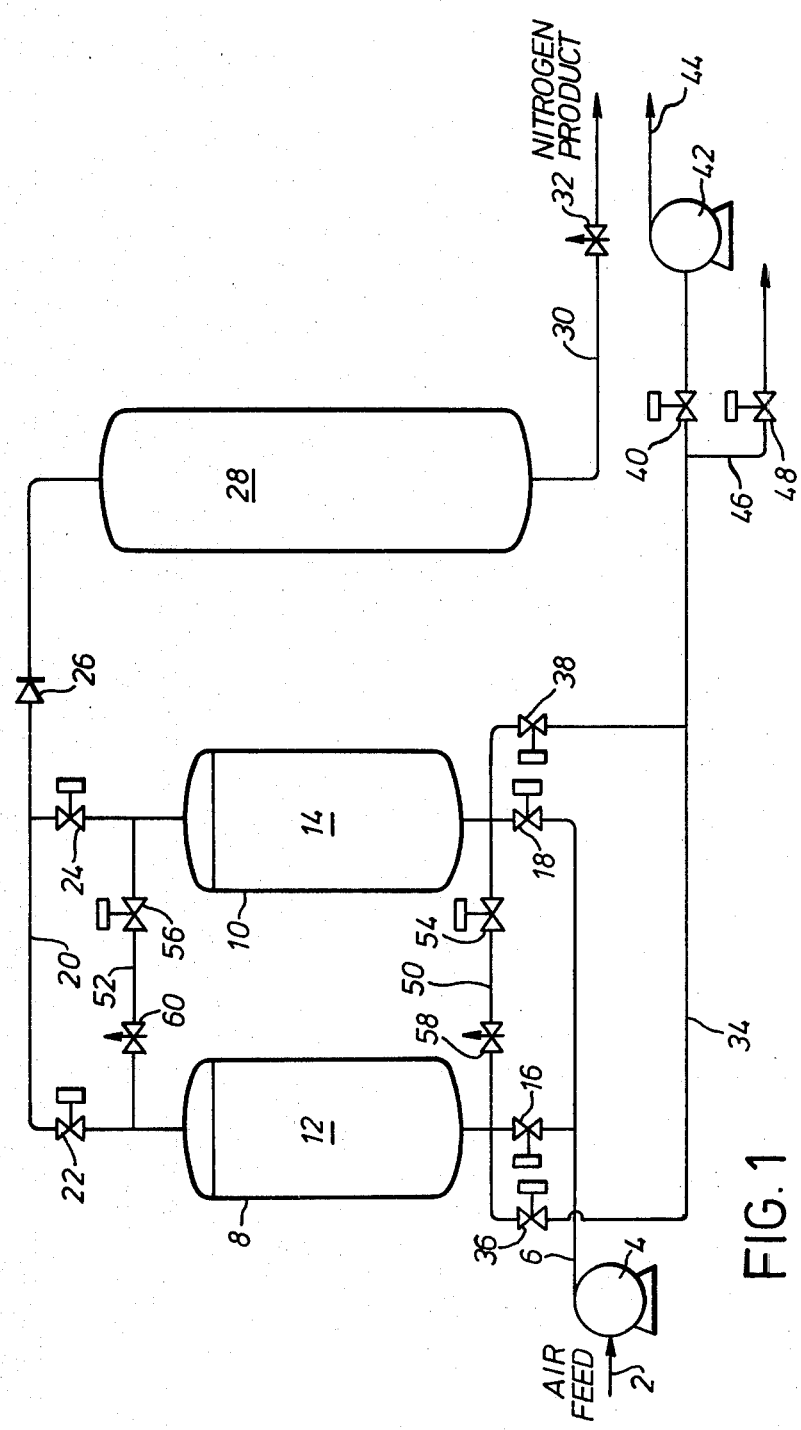
FIG. 1 is a schematic diagram for plant for the separation of nitrogen from air in accordance with the invention.

Referring to FIG. 1, the illustrated plant includes an air feed pipeline 2 leading to a compressor 4. The outlet of the compressor 4 communicates with an air inlet pipeline 6. The air inlet pipeline 6 is able to be placed in communication with either one of columns 8 and 10 containing beds 12 and 14 of carbon molecular sieve adsorbent. Valve 16 is operable to place the bottom of bed 12 in communication with the inlet pipeline 6 or to deny communication between the bed 12 and the inlet pipeline 6. Analogously valve 18 is operable to place the bottom of the bed 14 in communication with the inlet pipeline 6, or to deny such communication.

The plant shown in FIG. 1 has an outlet pipeline 20. A stop valve 22 is operable to place the top of the bed 12 in communication with the pipeline 20 or to prevent communication between the bed 12 and the pipeline 20. Analogously, the stop valve 24 is operable to place the top of the bed 14 in communication with the pipeline 20 or to deny such communication. The pipeline 20 communicates with a buffer vessel 28 of larger volume than either column 12 or column 14 (which are identical to one another). In the pipeline 20 is a non-return valve 26 set to be open only when the pressure upstream thereof exceeds the pressure downstream thereof. The buffer vessel 28 has an outlet to pipeline 30 for product gas. In the pipeline 30 is disposed a flow control valve 32.

The plant shown in FIG. 1 has an outlet pipeline 34 for waste gas. A valve 36 is operable to place the bottom of the bed 12 in communication with the pipeline 34, or may be closed to deny such communication. A valve 38 is operable to place the bottom of the bed 14 in communication with the pipeline 34 or, when closed, denies such communication. The pipeline 34 communicates with a vacuum pump 42. The outlet of the vacuum pump 42 communicates with a pipeline 44 for the discharge of waste gas from the plant. In communication with the pipeline 34 upstream of a valve 40 is a vent pipeline 46 communicating with the atmosphere. In the pipeline 46 is a stop valve 48. If desired, the vent pipeline 46 and the valve 48 may be omitted from the plant. Alternatively, the vacuum pump 42 and valves 40 and 48 may be omitted. If the vacuum pump is omitted the beds will be subjected to atmospheric pressure to effect desorption of previously adsorbed oxygen. If the vent pipeline 46 and the valve 48 are omitted the beds 12 and 14 will be subjected to a sub-atmospheric pressure in order to effect desorption of previously adsorbed gas. However, regeneration is preferably effected by opening valve 48 while keeping valve 40 closed, and then closing valve 48 and opening valve 40, the vacuum pump 42 being operated while the valve 40 is open. The bed is thus regenerated by placing it in communication with the atmosphere and then subjecting it to a sub-atmospheric pressure.

A pipeline 50 connects together the bottoms of the columns 8 and 10. A similar pipeline 52 connects together the tops of the columns 8 and 10. In the pipeline 50 is disposed a stop valve 54, and in the pipeline 52 is disposed a stop valve 56. When the valves 54 and 56 are open there is communication between the beds 12 and 14. No such communication is allowed when the valves 54 and 56 are closed.

In the pipeline 50 is a flow control valve 58, and in the pipeline 52 is a flow control valve 60.

The valves 16, 18, 22, 24, 36, 38, 40, 48, 54 and 56 are all automatically operated, typically by solenoids.

The valves 32, 58 and 60 are typically manually operable flow control valves which may be set to give a chosen flow rate of gas therethrough.

The valves 16, 18, 22, 24, 36, 38, 40, 48, 54 and 56 typically each have two positions only, in one of which the valve is closed and in the other of which the valve is open without there being any substantially restriction to the flow of gas therethrough.

The operation of the plant shown in FIG. 1 will now be described with reference to FIGS. 2 and 3. For the purposes of the ensuing description, it is assumed that the pipeline 46 and the valves 40 and 48 are omitted from the plant shown in FIG. 1.

Figure 2:
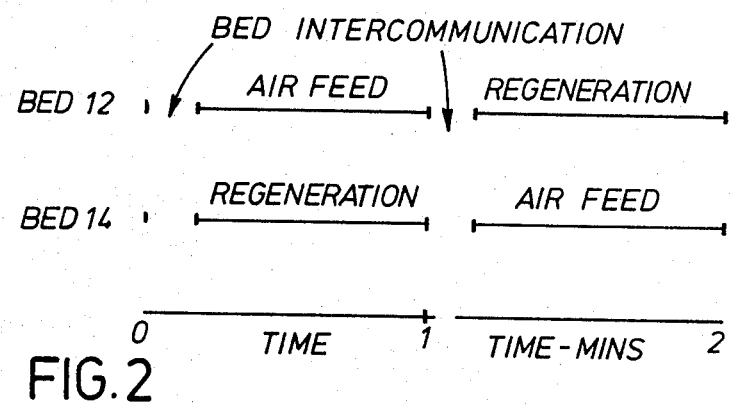
FIG. 2 indicates the sequencing or phasing of the operating cycles for the two adsorbent beds shown in FIG. 1.
Figure 3:
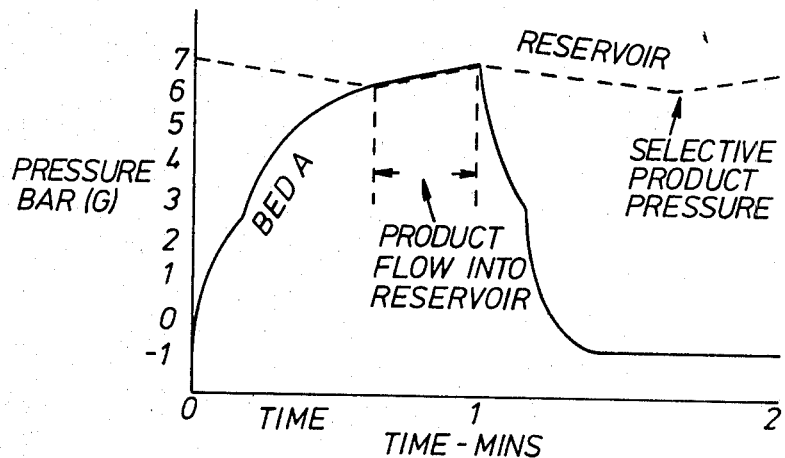
FIG. 3 indicates the variation in bed pressure throughout the operating cycle shown in FIG. 2 and the variation in product pressure throughout that cycle.

At the start of the cycle of operation shown in FIG. 2 the bed 12 is at a sub-atmospheric pressure being subject to vacuum created by the pump 42 and the bed 14 is at its maximum pressure being in communication with the compressor 4. The cycle starts with the beds 12 and 14 being placed in communication with one another through the pipelines 50 and 52. In this phase of the cycle valves 16, 18, 22, 24, 36 and 38 are all in their closed positions and valves 54 and 56 are open. Unadsorbed nitrogen-rich gas in the spaces between individual particles of adsorbent in the bed 14 flows through pipelines 50 and 52 into the bed 12. The flow control valves 58 and 60 restrict such flow. These valves are set to as to give equal flow rates therethrough. The setting of the valves is such that the gravitational forces on the particles of adsorbent at the top of the bed 14 is always at least twice the upward force exerted thereupon by gas passing from the bed 14 to the bed 12. The unadsorbed gas in the bed 14 which passes to the bed 12 is rich in nitrogen. As it passes to the bed 12 so the pressure in the bed 12 increases from below atmospheric pressure and the pressure in the bed 14 undergoes a corresponding reduction. At the end of the pressure difference reduction phase of the cycle the pressure in the bed 14 is above that in the bed 12.

During the first phase of the cycle product gas (nitrogen-rich gas) is supplied continuously from the buffer vessel 28. Since during this part of the cycle no gas flows into the buffer vessel 28 the delivery pressure of the product gas falls as shown in FIG. 3 (see the broken line).

At the end of the first phase of the cycle the valves 54 and 56 close and the valves 16, 22 and 38 open. Thus, the second phase of the cycle shown in FIG. 2 starts. In this phase of the cycle compressed air flows from the compressor 4 through the pipeline 6 to the bed 12 and product gas flows out of the bed 12 into the pipeline 20 and (when the valve 26 is open) into the buffer vessel 28. In addition, operation of the vacuum pump 42 causes oxygen adsorbed by the bed 14 to be desorbed and to flow out of the column 10 in a direction counter to that of passage of incoming air.

During the initial stage of the second phase of the operating cycle the pressure in bed 12 is less than that in the buffer vessel 28 so that no nitrogen-rich gas is allowed to flow into the vessel 28, such flow being stopped by the valve 26. Nonetheless, during this stage of the second phase the adsorbent in the bed 12 is able to adsorb oxygen from the compressed air flowing into the bed 12 from the inlet pipeline 6 and thereby leave a gas relatively rich in nitrogen. The incoming air will also be enriched by the nitrogen-rich gas which has passed to the bed 12 from the bed 14 during the previous phase of reducing the pressure difference between the beds. At the same time as the bed 12 is adsorbing oxygen from the incoming gas so the bed 14 is being regenerated. Immediately the bed 14 is subjected to the vacuum applied by the vacuum pump 42 there is a rapid drop in its pressure until atmospheric pressure in the bed 14 is achieved.

When the pressure in the bed 12 exceeds that in the buffer vessel 28 the valve 26 opens and nitrogen-rich gas flows into the buffer vessel 28. The flow control valve 32 is set to ensure that the flow of gas into the buffer tank 28 is at a greater rate than the flow of gas out of such vessel. Thus, after having progressively fallen from the time of starting the first phase of the cycle of operation shown in FIG. 2 the pressure of the gas delivered from the pipeline 30 begins to increase as shown in FIG. 3.

At the end of the second pipe of the operating cycle the pressure in the bed 12 reaches substantially that to which the incoming air is compressed by the compressor 4 and the bed 14 has acquired a sub-atmospheric pressure substantially equal to that applied by the vacuum pump 42.

The end of the second phase of the operating cycle is marked by the valves 16, 22 and 38 closing and the valves 54 and 56 reopening.

In the third phase of the operating cycle shown in FIG. 2 the pressure difference between the beds 12 and 14 is reduced. This phase of the operating cycle is exactly analogous to the first phase, except that in this instance the flow of nitrogen-rich gas is from the bed 12 to the bed 14. The end of the third phase of the cycle is marked by the valve 54 and 56 closing and the valves 18, 24 and 36 opening. The final phase of the operating cycle is analogous to the second phase thereof except that in this instance it is the bed 14 that adsorbs oxygen from incoming compressed air while the bed 12 is regenerated by being subjected to a sub-atmospheric pressure applied by the vacuum pump 42. At the end of the fourth or final phase of the operating cycle the valves 18, 24 and 36 close and the valves 54 and 56 open again so that the cycle can be repeated.

Typically, the incoming air is compressed to a chosen pressure in the range 3 to 8 bar. Typically, during desorption or regeneration the bed being desorbed or regenerated is subjected to a chosen vacuum in the range 0.1 to 0.2 bar. Typically, at the end of each phase of reducing the pressure difference between the beds the pressure difference therebetween is in the range of 0.05 to 0.8 bar depending on the difference between the pressures of the two beds at the start of the phase of reducing the difference in pressure between the two beds.

Typically, each phase of reduction of the difference in pressure between the two beds may last for 5 seconds and each phase of adsorption and regeneration may last for 55 seconds so that the total operating cycle is 2 minutes in duration.

EXAMPLE

In this example the plant shown in FIG. 1 was operated with beds of carbon molecular sieve of height 1.3 meters, with the average particle diameter being 3 mm. Each phase of reducing the pressure difference between the beds lasted for 4 seconds. The pressures of the two beds at the start of this phase are shown in the first two columns of the accompanying table, and in the third column is shown the final pressure difference between the beds at the end of the phase of reducing the pressure difference therebetween.

TABLE

| Bed Equalisation Conditions | | |
|---|---|---|
| Initial pressures | Final Pressure Differential | Time Sec. |
| 8 bar    0.013 bar | 0.7 bar | 4 |
| 6.5 bar  0.013 bar | 0.55 bar | 4 |
| 5 bar    0.013 bar | 0.3 bar | 4 |
| 3.5 bar  0.013 bar | 0.07 bar | 4 |

I claim:
1. A process for the separation of a gas mixture which includes:
   (1) repeatedly performing a cycle of operations on a first bed of adsorbent which adsorbs one component of the gas mixture more readily than another or the other component of the gas mixture, the cycle of operations comprising the steps of:

(a) passing the gaseous mixture at superatmospheric pressure through the bed of adsorbent and thereby adsorbing said one component;

(b) reducing the pressure of the bed to a value intermediate said superatmospheric pressure and atmospheric pressure;

(c) regenerating the bed, which step comprises desorbing gas therefrom by further reducing the pressure of the bed, and causing the desorbed gas to flow out of the bed in a direction counter to the direction of passing the gaseous mixture, and (d) increasing the pressure of the bed to a value intermediate said superatmospheric pressure and atmospheric pressure;

(2) repeatedly performing such a cycle of operations on a second bed of such adsorbent; wherein the cycles are phased such that when the pressure of one bed is reduced after desorption but before its regeneration, the pressure of the other bed is being increased after its regeneration but before adsorption, and vice versa, and the steps (b) and (d) are performed by placing the beds in communication with one another through at least one restricted passage for a period of time insufficient for the pressures of the beds to equalise.

2. A process according to claim 1, in which the gas mixture to be separated is air, and the adsorbent is a carbon molecular sieve.

3. A process according to claim 2, in which step (b) and step (d) of the cycle of operations each lasts for 4 to 5 seconds.

4. A process according to claim 1, in which each cycle of operations lasts for two minutes.

5. A process according to claim 2, in which at the end of step (b) and step (d) the pressure difference between the beds is from 0.07 to 0.7 bar.

6. A process according to claim 1, in which the passage of gas between the beds is so restricted that the upward force on the adsorbent owing to gas flow does not exceed one half of the gravitational force thereupon.

* * * * *